US011449326B2

(12) United States Patent
Ari et al.

(10) Patent No.: US 11,449,326 B2
(45) Date of Patent: *Sep. 20, 2022

(54) SYSTEMS AND METHODS FOR RECOMPUTING SERVICES

(71) Applicant: ServiceNow, Inc., Santa Clara, CA (US)

(72) Inventors: Tal Ben Ari, Ness Ziyonna (IL); Tal Kapon, Givataim (IL); Yuval Rimar, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 16/921,177

(22) Filed: Jul. 6, 2020

(65) Prior Publication Data

US 2020/0334080 A1 Oct. 22, 2020

Related U.S. Application Data

(63) Continuation of application No. 15/890,107, filed on Feb. 6, 2018, now Pat. No. 10,705,875.

(Continued)

(51) Int. Cl.
*G06F 8/60* (2018.01)
*G06F 8/61* (2018.01)
(Continued)

(52) U.S. Cl.
CPC .............. *G06F 8/65* (2013.01); *G06F 8/60* (2013.01); *G06F 8/658* (2018.02); *G06F 8/70* (2013.01);
(Continued)

(58) Field of Classification Search
CPC ..... G06F 8/60; G06F 8/65; G06F 9/48; G06F 9/4843; G06F 9/4881; G06F 9/5005;
(Continued)

(56) References Cited

U.S. PATENT DOCUMENTS 5,524,247 A 6/1996 Mizuno
5,978,594 A 11/1999 Bonnell
(Continued)

OTHER PUBLICATIONS

Dahman, Charoy, and Godart. "Alignment and Change propagation between Business Processes and Service-Oriented Architectures." 2013 IEEE Int'l Conf. on Services Computing. Jun. 2013. Santa Clara, CA. [obtained online via IEEE Explore] <url:http:\ \https ://ieeexplore. ieee .org/abstract/document/6649692> (Year: 2013).

*Primary Examiner* — Charles M Swift
(74) *Attorney, Agent, or Firm* — Fletcher Yoder P.C.

(57) ABSTRACT

Systems, methods, and media are presented that are used to recompute a service model to match data in a configuration management database. Recomputing includes detecting a change to a configuration item in a configuration management database and marking a recomputing environment indicating a recomputing environment to be recomputed based on the change. Using a recomputation job, a service environment database is queried and a response is received from the service environment indicating at least the recomputing environment. The recomputation job then recomputes the service environment to match a service model to the change in the configuration management database.

20 Claims, 10 Drawing Sheets

Related U.S. Application Data

(60) Provisional application No. 62/543,098, filed on Aug. 9, 2017.

(51) Int. Cl.

| | | |
|---|---|---|
| *G06F 8/65* | (2018.01) | |
| *G06F 8/70* | (2018.01) | |
| *G06F 8/71* | (2018.01) | |
| *G06F 9/48* | (2006.01) | |
| *G06F 9/50* | (2006.01) | |
| *G06F 16/23* | (2019.01) | |
| *G06F 16/903* | (2019.01) | |
| *G06F 8/658* | (2018.01) | |

(52) U.S. Cl.
CPC .............. *G06F 8/71* (2013.01); *G06F 9/4843* (2013.01); *G06F 9/4881* (2013.01); *G06F 9/5005* (2013.01); *G06F 16/23* (2019.01); *G06F 16/90335* (2019.01)

(58) Field of Classification Search
CPC ...... G06F 16/23; G06F 16/90335; G06F 8/70; G06F 8/71; H04L 41/0813; H04L 41/0856
See application file for complete search history.

(56) References Cited

U.S. PATENT DOCUMENTS

| | | | |
|---|---|---|---|
| 6,098,078 A | 8/2000 | Gehani et al. | |
| 6,321,229 B1 | 11/2001 | Goldman | |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,389,332 B1 | 6/2008 | Muchow et al. | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,877,783 B1 | 1/2011 | Cline | |
| 7,890,802 B2 | 2/2011 | Gerber | |
| 7,925,981 B2 | 4/2011 | Pourheidar | |
| 7,930,396 B2 | 4/2011 | Trinon | |
| 7,941,506 B2 | 5/2011 | Bonal | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,346,752 B2 | 1/2013 | Sirota | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,646,093 B2 | 2/2014 | Myers | |
| 8,674,992 B2 | 3/2014 | Poston | |
| 8,683,032 B2 | 3/2014 | Spinelli | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Meuller | |
| 8,887,133 B2 | 11/2014 | Behnia | |
| 8,907,988 B2 | 12/2014 | Poston | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,261,372 B2 | 2/2016 | Cline | |
| 9,317,327 B2 | 4/2016 | Apte | |
| 9,323,801 B2 | 4/2016 | Morozov | |
| 9,363,252 B2 | 6/2016 | Mueller | |
| 9,417,917 B1 | 8/2016 | Barber et al. | |
| 9,412,084 B2 | 9/2016 | Kowalski | |
| 9,467,344 B2 | 10/2016 | Gere | |
| 9,535,737 B2 | 1/2017 | Joy | |
| 9,557,969 B2 | 1/2017 | Sharma | |
| 9,534,903 B2 | 4/2017 | Cline | |
| 9,613,070 B2 | 4/2017 | Kumar | |
| 9,631,934 B2 | 4/2017 | Cline | |
| 9,645,833 B2 | 5/2017 | Mueller | |
| 9,654,473 B2 | 5/2017 | Miller | |
| 9,659,051 B2 | 5/2017 | Hutchins | |
| 9,792,387 B2 | 10/2017 | George | |
| 9,852,165 B2 | 12/2017 | Morozov | |
| 9,967,162 B2 | 5/2018 | Spinelli | |
| 10,002,203 B2 | 6/2018 | George | |
| 10,148,506 B1* | 12/2018 | Anburose | H04L 41/0853 |
| 2012/0158882 A1 | 6/2012 | Oehme et al. | |
| 2015/0007187 A1 | 1/2015 | Shows | |
| 2016/0142262 A1* | 5/2016 | Werner | H04L 41/22 709/224 |
| 2016/0182299 A1 | 6/2016 | Polinati et al. | |
| 2017/0126472 A1 | 5/2017 | Margalit et al. | |
| 2017/0155788 A1* | 6/2017 | Kobayashi | H04N 1/32765 |
| 2017/0187573 A1* | 6/2017 | Haswell | H04L 43/14 |
| 2017/0207985 A1 | 7/2017 | Jayanti Venkata et al. | |
| 2017/0339013 A1* | 11/2017 | Allen | H04L 41/0816 |

* cited by examiner

SYSTEMS AND METHODS FOR RECOMPUTING SERVICES

CROSS REFERENCE TO RELATED APPLICATION

This application is a continuation of U.S. patent application Ser. No. 15/890,107 filed Feb. 6, 2018, which claims the benefit of U.S. Provisional Application No. 62/543,098, filed Aug. 9, 2017, entitled "SYSTEMS AND METHODS FOR RECOMPUTING SERVICES," the contents of which is herein expressly incorporated by reference for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with each having its own functions, properties, and/or permissions. Such resources may include hardware assets, such as computing devices, switches, and the like. Additionally or alternatively, the resources may include software assets, such as database applications, application programming interfaces (APIs), and the like. Additionally, other assets may be tracked (e.g., on-call staff assigned, etc.). Since these assets (and their related models) may change, a recomputation process may be used to address potentials changes and update modeling accordingly. However, the recomputation process may consume processing resources, thereby negatively effecting platform performance, and/or may significantly increase a load on an instance.

BRIEF DESCRIPTION OF THE DRAWINGS

The description herein makes reference to the accompanying drawings, wherein like reference numerals refer to like parts throughout the several views.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an electronics-driven world in which various electronic devices are interconnected within a distributed context. As more and more functions are performed by services using some form of distributed computing, the complexity of IT network management increases. As these devices are separated geospatially, managing and tracking configuration of these devices may become more difficult.

In such an interconnected but distributed context, the configuration of each of these devices may be represented by configuration items (CIs) that detail certain configurations, parameters, components, software, or settings associated with a respective device. CIs may include information related to physical entities (e.g., hardware), logical entities (e.g., version, instance of a database), conceptual entities (e.g., service), and/or a combination thereof. Furthermore, a conceptual entity may include multiple conceptual entities, such as multiple virtual datacenters, in one or more physical locations. Alternatively, a single conceptual entity (e.g., cloud service) may include multiple physical locations (e.g., datacenters) distributed to perform a specific function.

The CIs may change (e.g., configuration file changes, removal, relationship changes, additions) that may change a function/purpose (e.g., service or service layer) that utilizes the CIs. To ensure that a function works properly, a service model may be used to model the service. A service is made of one or more service layers each performing sub-functions of the service, and one or more services may be grouped together to form an environment. Recomputing each service on demand may congest a job scheduler and prevent worker threads from being available for other functions. Instead, a number of recompute jobs may be set that look for environments to be recomputed thereby leaving a remaining portion of worker threads available for other functions and lessening instance load and/or performance.

Figure 1:
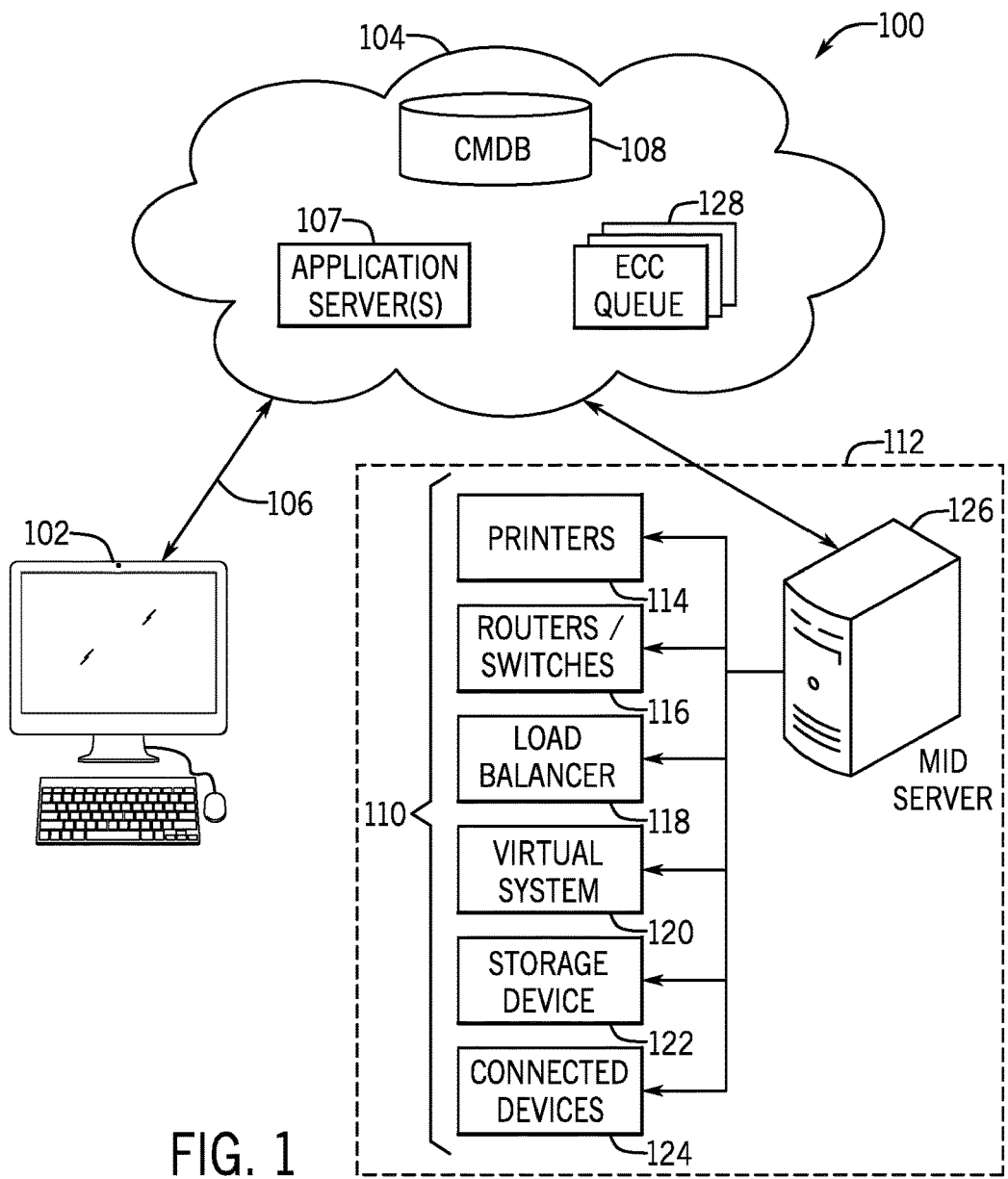
FIG. 1 is a block diagram of a distributed computing system, in accordance with an embodiment.

By way of introduction, FIG. 1 is a block diagram of a system 100 that utilizes distributed computing framework, which may perform one or more of the techniques described herein. As illustrated in FIG. 1, a client 102 communicates with a platform 104 (e.g., a platform) over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously or separately.

The platform 104, such as a cloud service, may include any suitable number of computing devices (e.g., computers) in one or more locations that are connected together communicate using one or more networks. For instance, the platform 104 may include various computers acting as servers in datacenters at one or more geographic locations where the computers are connected together using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or databases, such as the configuration management database (CMDB) 108, via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server (e.g., the CMDB 108).

The CMDB 108 is a series of tables containing information about all of the assets (e.g., hardware assets, software assets, etc.) and enterprise services controlled by a client 102 and the configurations of these assets and services. The assets and services include configuration items (CIs) 110 that may be computers, other devices on a network 112 (or group of networks), software contracts and/or licenses, or enterprise services. The CIs 110 include hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models. As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and/or the like. The CMDB 108 may include an index of CIs 110, attributes (e.g., roles, characteristics of elements, etc.) associated with the CIs 110, and/or relationships between the CIs 110. Furthermore, the CMDB 108 may track which configuration files identified pertain to each CI 110.

Additional to or in place of the CMDB 108, the platform 104 may include one or more other database servers. The database servers are configured to store, manage, or otherwise provide data (e.g., available workers for on-call actions, and so forth) for delivering services to the client 102 over the communication channel 106. The database server includes one or more databases (e.g., CMDB 108) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

In the depicted topology, access to the platform 104 is enabled via a management, instrumentation, and discovery (MID) server 126 via an External Communications Channel (ECC) Queue 128 and/or other queuing mechanisms. The MID server 126 may include an application program (e.g., Java application) that runs as a service (e.g., Windows service or UNIX daemon) that facilitates communication and movement of data between the platform 104 and external applications, data sources, and/or services. The MID server 126 may be executed using a computing device (e.g., server or computer) on the network 112 that communicates with the platform 104. As such, in some embodiments, the MID server 126 may connect back to the platform 104 using a virtual private network connection that simulates the CIs 110 being connected to the platform 104 on a common physical network.

As discussed below, the MID server 126 may periodically and/or intermittently use discovery probes to determine information on devices (e.g., service mapping of services using the devices) connected to the network 112 and return the probe results back to the platform 104. Probes may have different types and functions. For example, some probes get the names of devices of specific operating systems (e.g., Windows or Linux) while other exploration probes return disk information for those devices using the operating systems. Some probes run a post-processing script to filter the data that is sent back to the platform 104.

As a non-limiting example, the probe types available for use by the MID server 126 may include a Shazzam probe that determines what devices are active using a targeted port scan, a user-defined probe class, a multi-probe that combines probe types, and/or any combination thereof. Additionally or alternatively, the probe types may include any probe type that determines information about CIs 110.

In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The ECC queue 128 may be a database table that is typically queried, updated, and inserted into by other systems. Each record in the ECC queue 128 is a message from an instance in the platform 104 to a system (e.g., MID server 126) external to the platform 104 that connects to the platform 104 or a specific instance running in the platform 104 or a message to the instance from the external system. The fields of an ECC queue 128 record include various data about the external system or the message in the record. For example, the record may include an agent field, a topic field, a name field, a source field, a response to field, a queue field, a state field, a created time field, a processed time field, a sequence number for the message, an error string field, a payload field, and/or other suitable fields for identifying messages and/or the systems sending/receiving the message. The agent field identifies a name (e.g., mid.server.xxxx) of the external system that the message is directed to or originates from. The topic field is a value (e.g., arbitrary values) that indicates that a message pertains to a particular subject. For example, during discovery of CIs 110, the topic field may be populated with a value to identify a name of the probe that has been/is going to be run. The name field provides more detail in a context indicated by the topic field. For example, in discovery, the name field may be a descriptive and human-readable name or a command to be run by the probe identified in the topic field. Alternatively, if the topic field contains "SSHCommand", the name field may indicate the shell command to be run.

The source field indicates a target or recipient of the message outside of the platform 104. In discovery, the source field may contain an Internet Protocol (IP) address that the discovery probe is to be/has been run against, or the field may include a human-readable description when the probe is to be/has been run against multiple IP addresses.

The response to field, when included, contains a reference (e.g., sys id) to the ECC queue 128 that the message is a response to. In discovery, a discovery result may be a response to a discovery schedule message.

The queue field indicates whether the message is incoming to the platform 104 or outgoing from the platform 104. The state field indicates whether the message is ready to be processed, is being processed, or has been processed. The recipient of the message generally updates this field. The time created field indicates when the record was first stored in the ECC queue 128. The time processed field indicates when the record was updated to processed.

In some embodiments, the messages are sequenced using a sequencing field that includes a number assigned at generation of the record. The error string field, when included, indicates that an error occurred and/or a type of error that occurred.

The payload field is the body of the message. The contents of this field are specific to the context of the record and the system that is exchanging information with the platform 104. For example, a result of a discovery probe uses Extensible Markup Language (XML) documents for the payload. For instance, in some embodiments, the returned XML document may have a root tag of  containing one or more <result> tags and a single <parameters> tag. The parameters are simply an echo of those sent to the MID server 126 in the probe.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

Figure 2:
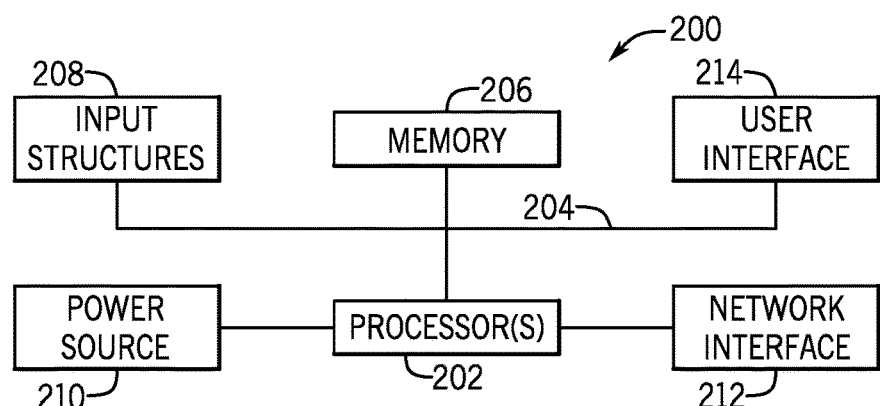
FIG. 2 is a block diagram of a computing device utilized in the distributed computing system of FIG. 1, in accordance with an embodiment.

In any case, to perform one or more of the operations described herein, the client 102, the application server 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses.

In any case, to perform one or more of the operations described herein, the client 102, the application server 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., CMDB 108), other servers in the platform 104 (e.g., server hosting the ECC queue 128), device running the MID server 126, and/or any of the CIs 110. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processor capable of performing instructions stored in the memory 206. For example, the one or more processors may include microprocessors, system on a chips (SoCs), or any other performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, haptic feedback, and the like.

Figure 3:
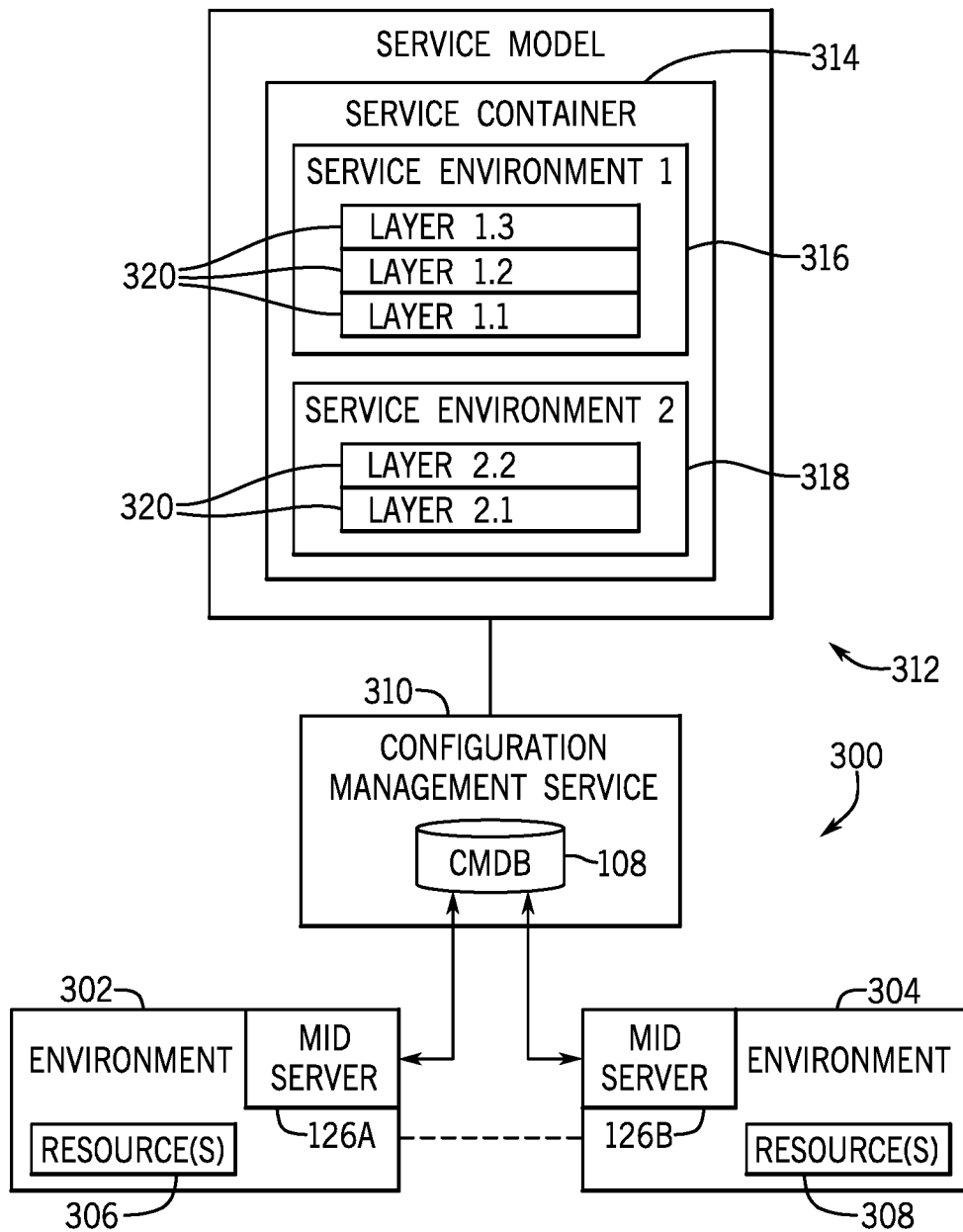
FIG. 3 is a block diagram of an electronic computing and communication system that utilizes the distributed computing system of FIG. 1, in accordance with an embodiment.

FIG. 3 is a block diagram of an embodiment of an electronic computing and communication system 300 for discovering and/or managing connected CIs. The electronic computing and communication system 300 includes one or more environments such as environments 302 and 304 each including resources 306 and 308, respectively. Each environment 302, 304 may include one or more networks coupling resources together in a location-based, function-based, and/or common credentials-based grouping. For example, the environments 302, 304 may include a customer service environment used to represent customer service infrastructure in a technical support, sales, billing, and/or other groupings.

For example, the environments 302, 304 may include a datacenter and all devices coupled to one or more networks located at the datacenter. Additionally or alternatively, the environment 302, 304 may be distributed across multiple geographical locations. Thus, the environment 302, 304 may include any devices that are accessible by a user account including resources that may be spatially distant from each other. In some embodiments, resources 306, 308 of the environments 302, 304 may communicate with each other across environments. However, in other embodiments, aspects of various environments may be provided by different vendors without communication therebetween. In such embodiments, the resources of disparate environments may communicate using the platform 104 (e.g., a configuration management service 310 that is a part of the platform 104 including the CMDB 108). The resources 306 and 308 may include any of the CIs 110 previously discussed.

The configuration management service 310 may include one or more servers providing access to and managing the CMDB 108. The configuration management service 310 may allocate or provision resources, such as application instances in the resources 306 or 308 from a respective environment 302 or 304. Further, the configuration management service 310 may create, modify, or remove information in the CMDB 108 relating to the resources 306 or 308. Thus, the configuration management service 310 may manage a catalogue of resources in more than a single environment (even if the environments do not directly communicate with each other). Using this catalogue, the configuration management service 310 may discover new resources, provision resources, allocate resources, modify, and/or remove resources from the catalogue across a single environment or multiple environments. In some embodiments, these actions may be initiated using the client 102, scheduled for periodic occasions (e.g., periodic discovery), or a combination thereof. For example, a client 102 may receive a request, via its input structures, to query an identity of an application program interface (API) used by a resource to access a particular vendor/provider for the environment 302 that is passed to the configuration management service 310 to query the CMDB 108. As another example, the client 102 may receive a request, via its input structures, to query an identity of a user authorized to access a particular resource that is passed to the configuration management service 310.

As previously discussed, the CMDB 108 may be populated utilizing a discovery process which may be used to discover the resources 306 or 308. Moreover, as previously discussed, the discovery process may include determining the properties or attributes of the resources 306 or 308 in their respective environments 302 or 304 using a respective MID server 126A or 126B. In the illustrated embodiment, each environment 302 and 304 has its own MID server 126A and 126B. In some embodiments, a single MID server 126A or 126B may be employed when the MID server may reach into multiple environments. For example, if the MID server 126A or 126B is run in the platform 104 (e.g., in the configuration management service 310), a single MID server 126A or 126B may be used to manage both environments 302 and 304. Additionally or alternatively, if the MID server 126A has access to the environment 304, the MID server 126B may be omitted.

As previously discussed, each discovered resource may be identified as a configuration item 110 with a record stored in the CMDB 108 including data indicating properties, attributes, dependencies, or other information about the resource. The CMDB 108 may be encoded, for example, as a relational database management system (RDBMS); an object-oriented database (e.g. an XML database); a network model database; or a flat-file database.

A service model 312 may be used to supply a common infrastructure to service assurance, service mapping, and service delivery. In other words, the service model 312 models relationships and connections of resources as reflected in the CMDB 108. The service model 312 includes one or more service containers 314 that contain information about various service environments 316 and 318. These service environments 316 and/or 318 may enable separation into various environments (e.g., development, production, testing, etc.) of a service corresponding to the container 314. In some embodiments, these service environments 316 and/or 318 may correspond to the environments 302 and/or 304. Each service environment may include one or more service layers 320. These layers 320 may include information and/or actions for the service corresponding to the container 314. For example, the service layers 320 may include service definitions, environment definitions, states, and/or other information about the service container 314 and/or the service environments 316 and 318. The layers 320 may include entry points, mapping information, and/or other suitable information. In some embodiments, these service layers 320 may be arranged hierarchically.

As previously discussed, service modeling uses the service model as infrastructure for discovered services. Each service-mapping-discovered service's structure depends on the service model being synchronized with the CMDB 108. Synchronization between the CMDB 108 and the service model is maintained using a recomputation process. The recomputation process includes recalculating the structure of a business service following a change in CMDB 108. The change in the CMDB 108 may include either a change to a CI attribute or a change to the service topology (e.g., relations removed, relations added, etc.).

Figure 4:
FIG. 4 is a screen of a job scheduler that may be used to process jobs in the distributed computing system of FIG. 1, in accordance with an embodiment.

However, as previously noted, this recomputation process may negatively change instance loading and/or platform 104 performance. For example, if a CI change occurs, a business service triggers scheduling of a new job (e.g., by calling an API). These jobs may be scheduled for an immediate one-time run. These jobs may include a default or configurable priority. The target layer to run the job is indicated in the job's document key. Each job runs the recomputation process on its assigned layer. In other words, each job recomputes a specific layer of a specific business service. However, a job scheduler 350, as illustrated in FIG. 4, may become congested with recompute jobs 352 (denoted as "ASYNC: Script Job"). Even with some limitation on recomputations (e.g., no concurrent recomputations on a same layer), the number of recomputations may become unwieldy, flooding the job scheduler 350. This flooding of the job scheduler may lead to many or all of the worker threads being simultaneously utilized for recomputation for at least a duration of time. This also causes high load on the instance negatively effecting instance performance and/or responsiveness. To address this issue, a number of worker threads being used simultaneously may be limited to a threshold value. This may be done by 1) postponing execution of recomputation jobs, 2) using platform 104 events with queuing, and/or 3) using a fixed (e.g., configurable) number of recomputation jobs running periodically and querying for business services that await recomputation and recomputing the business services.

Figure 5:
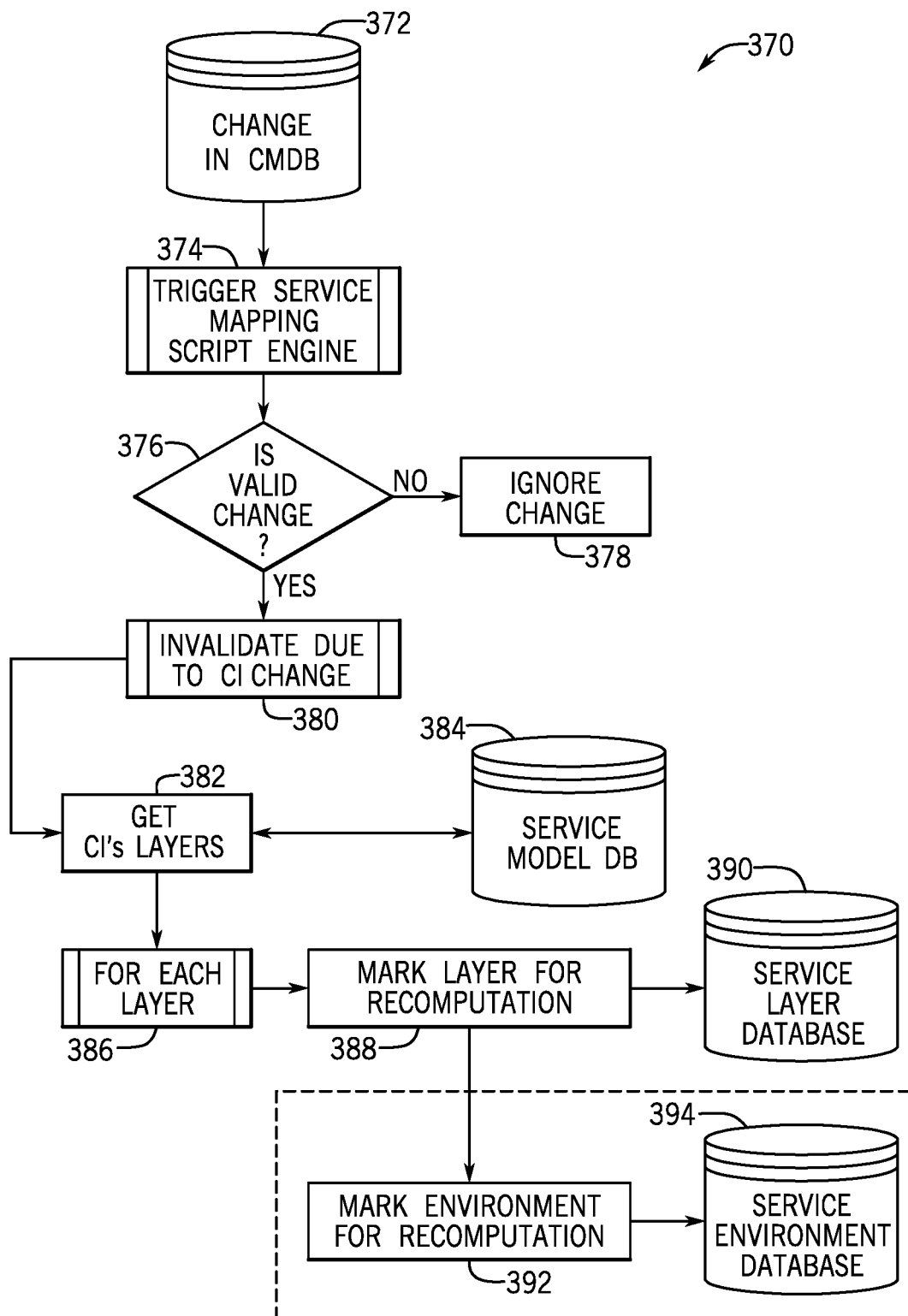
FIG. 5 is a block diagram illustrating a process for marking environments to be recomputed, in accordance with an embodiment.

FIG. 5 illustrates a flow diagram illustrating a process 370 for generating a request for recomputation of services. The process 370 includes an occurrence of a change (block 372) in the CMDB 108. The change may include a change in a topology of a service and/or a change in a CI in the service. For example, this change may be indicated in the CMDB 108 as a tracked change in a configuration file for a CI and/or relations between CIs. The change causes a trigger of a service mapping engine (block 374). The service mapping engine may be implemented using the platform 104. The service mapping engine determines whether the change is valid (block 376). When the change is invalid, the change is ignored (block 378). When the change is valid, the service mapping engine invalidates a service map due to the CI change (block 380). The service mapping engine then obtains CI layers for CIs that have changed (block 382). For example, the CI layers may be obtained from a service model database 384 that includes service model associations for the appropriate CIs. For each layer obtained (block 386), the service mapping engine marks each obtained layer for recomputation (block 388). For example, the service mapping engine may flag entries in a service layer database 390.

In some embodiments, this flagging may cause a recomputation to be invoked. However, if such recomputations are automatic, the job scheduler 350 and/or corresponding worker threads may become congested. Instead, each layer's environment may also be flagged for recomputation rather than causing recomputing of the service layers/services individually. In this way, each recomputation job may search for recomputations to perform rather than automatically creating a scheduled recomputation job and/or a queue entry in response to a change. To enable recomputation jobs to search for services and/or environments to be recomputed, the service mapping engine marks an environment corresponding to each layer for recomputation (block 392). For example, the environment may be flagged by marking the corresponding environment in a service environment database 394 indicating which recomputations are to be completed for each layer. The entries in the service environment database 394 may be used by the service mapping engine to later determine environments that are available and marked for recomputation.

Figure 6:
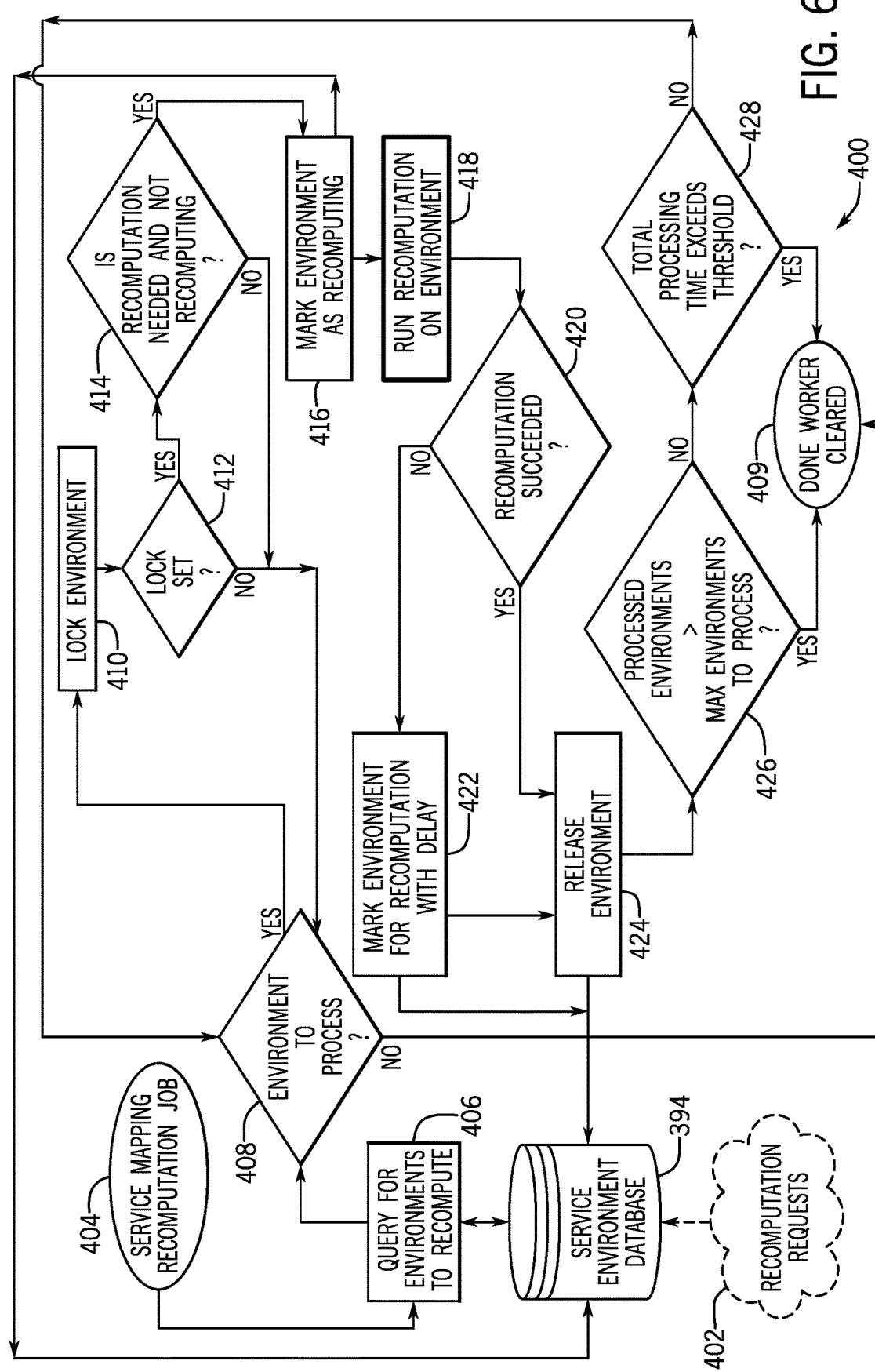
FIG. 6 is a block diagram illustrating a process for recomputing the marked environments of FIG. 5, in accordance with an embodiment.

FIG. 6 shows a flow diagram of a process 400 for processing recomputation requests 402. Recomputation requests 402 may include a worker thread allocated to recomputation using a recomputation engine that is running on the platform 104. The recomputation engine may determine that a recomputation is to be performed. For example, the recomputation engine may determine that at least one environment in the service environment database 394 is flagged as needing a recomputation to be completed. A service mapping recomputation job 404 then queries for environments to recompute (block 406). Such queries may be directed at the service environment database 394. The recomputation engine then determines whether there is at least one environment to process (block 408). If the service recomputation database 394 has no environments to process the worker thread to perform the recomputation job is cleared for other actions (block 409).

If at least one environment is to be processed, the recomputation engine attempts to lock the environment to be recomputed (block 410). The recomputation engine determines whether the attempt to lock the environment is successful (block 412). The lock may be made by setting a flag in the service environment database. Locking the environment prevents the environment from being used before the environment is recomputed. If the environment is not successfully locked (e.g., environment used before recompute lock), the recomputation engine determines whether another environment (or the same environment) is available to complete the recompute process. If the lock is successful, the recomputation engine then determines whether recomputation is needed and not currently being processed (block 414). This ensures that the environment is not recomputed by two worker threads concurrently and/or after a recent computation has been completed to correct any changes. If the environment is not to be recomputed and/or is currently being recomputed, the recomputation engine attempts to determine whether another environment and/or the same environment is ready to be recomputed. If the environment is to be recomputed and/or is not currently being recomputed, the recomputation engine marks the environment as in the process of being recomputed (block 416). In some embodiments, in addition to determining whether the environment is to be recomputed and/or is currently being recomputed, the recomputation engine may determine whether a delay period has elapsed. In some embodiments, this delay period may be set when a recomputation has failed and/or has succeeded to enable other environments to recomputed after attempting to recompute one environment. By marking the environment as processing during recomputation, a worker thread performing the recomputation job may ensure that another worker thread does not attempt to recompute the same environment during the recomputation process Once the recomputation engine has flagged the environment as being recomputed, the recomputation engine causes the worker engine to run recomputation on the environment (block 418). The recomputation, as previously discussed, may include synchronizing a service model to the CMDB 108 by updating the service model.

In some embodiments, an identification engine may be used to walk through the service model and matching the data in the service model against data in the CMDB 108. In some embodiments, this traversal of the databases may be depth-first and/or a breadth-first traversal. A depth-first traversal results in numerous (e.g., thousands) of database queries in a single recomputation process, as a factor of the number of CIs and relations in the business service. However, a breadth-first traversal includes a number of queries as a function of the depth of the business service being recomputed. Since the depth of a business service generally is smaller that the number of CIs 110 and relations, each recomputation process may be divided into smaller parts suitable for the service map recomputation job 404 for a limited amount of time (e.g., recomputation duration threshold). Furthermore, dividing the service model database in the breadth-first traversal may also increase speed of traversal (e.g., 5-10 times speed of depth-first traversal).

Furthermore, in some embodiments, the identification engine may match data in the service model against data in the CMDB 108. However, in other embodiments, the identification engine may be decoupled from the recomputation process. For instance, the data in the service model may be directly based on data in the CMDB 108 with the identification engine acting as the gatekeeper for the CMDB 108. This direct relationship between data in the CMDB 108 and data in the service model may deal with data corruptions, duplicate entries, missing dependencies, and/or other data issues more In some embodiments, the recomputation may include running complete and/or limited discovery operations on the CIs, services, service layers, and/or service environment based on the CI change in the CMDB 108. The recomputation engine determines whether the recomputation was successful (block 420). If the recomputation fails, the recomputation engine marks the environment for recomputation with some delay (block 422). As previously noted, this delay provides a period of time in which other environments may be processed before recomputation of the environment is performed. The delay may be indicated as a specific time after which the environment may be recomputed. Additionally or alternatively, the delay may be a relative amount (e.g., +1 minute) that indicates the length of the delay. If the recomputation has been successful, the recomputation engine releases the environment (block 424). For example, a currently recomputing flag in the service environment database 394 may be set to false.

In some embodiments, a single recomputation job may be used to recompute more than a single environment. In some embodiments, the amount of environments to be processed by a single recomputation job may be set using a max environments threshold. This max environments threshold may be dynamically changed or may be statically set. Once one environment has been recomputed, the recomputation engine may determine whether the recomputation job has completed the threshold number of recomputations (block 426). For example, when the environment is released and/or an environment has completed, a number of completed recomputations for the recomputation job may be incremented. If this number exceeds the max threshold, the recomputation job is completed and/or the worker thread is cleared for other actions (e.g., subsequent recomputation job). If the threshold has not been exceeded, the recomputation engine determines whether an overall duration (e.g., 1 minute) for the recomputation job has exceeded a threshold value (block 428). By setting this overall duration, the recomputation engine can ensure that a single recomputation job does not consume resources for too long. In some embodiments, this threshold may be dynamically set. For example, the threshold may be manually entered and/or may be calculated based on instance/platform load. For instance, when instance/platform load is relatively high, the threshold may be set relatively low and vice versa. Additionally or alternatively, the threshold may be statically set (e.g., to a default value). If this time has been exceeded, the recomputation job is completed. If this time has not been exceeded, the recomputation job attempts to recompute another environment.

Figure 7A:
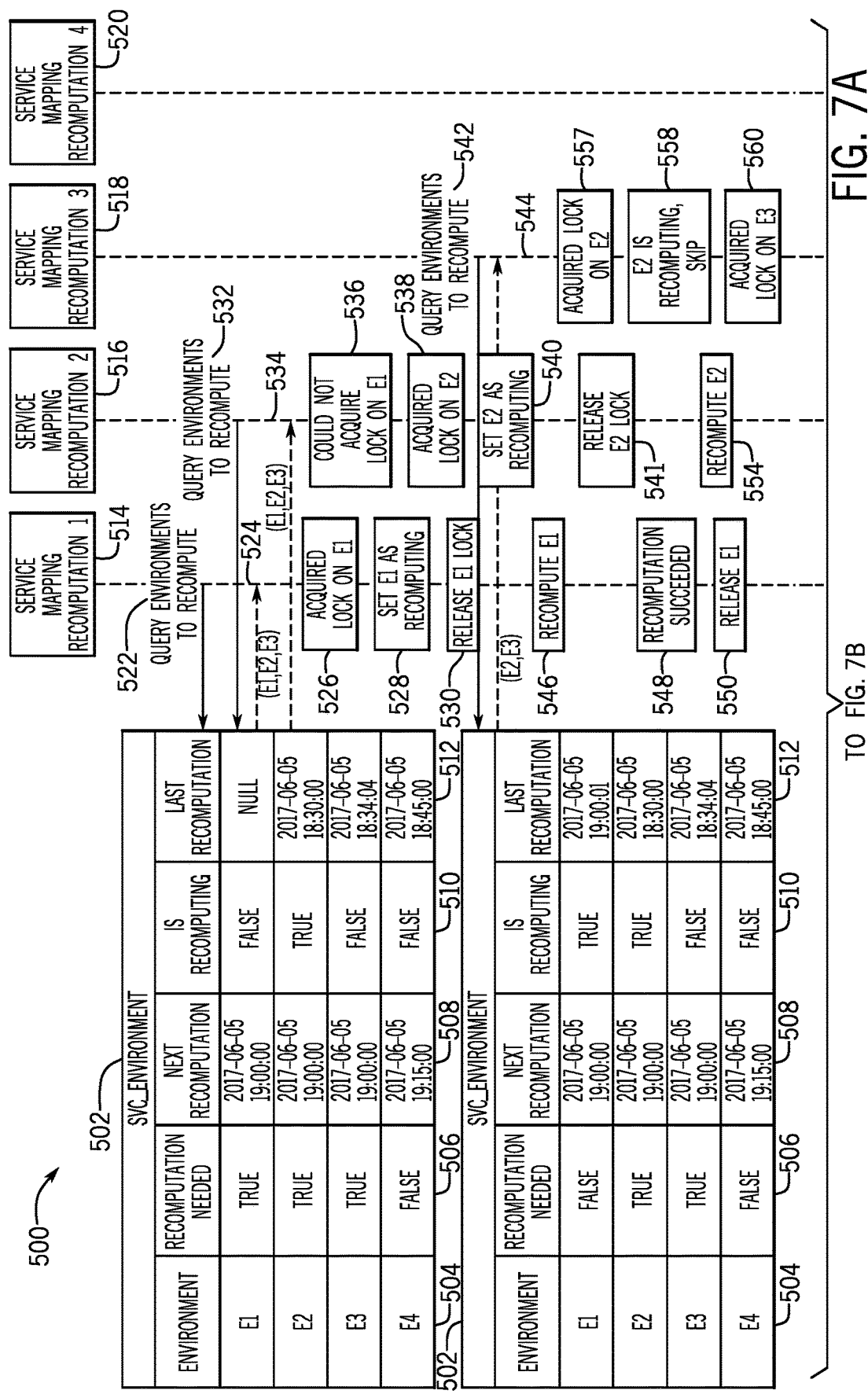
FIGS. 7A and 7B is a sequence diagram utilizing the process of FIG. 6, in accordance with an embodiment.
Figure 7B:
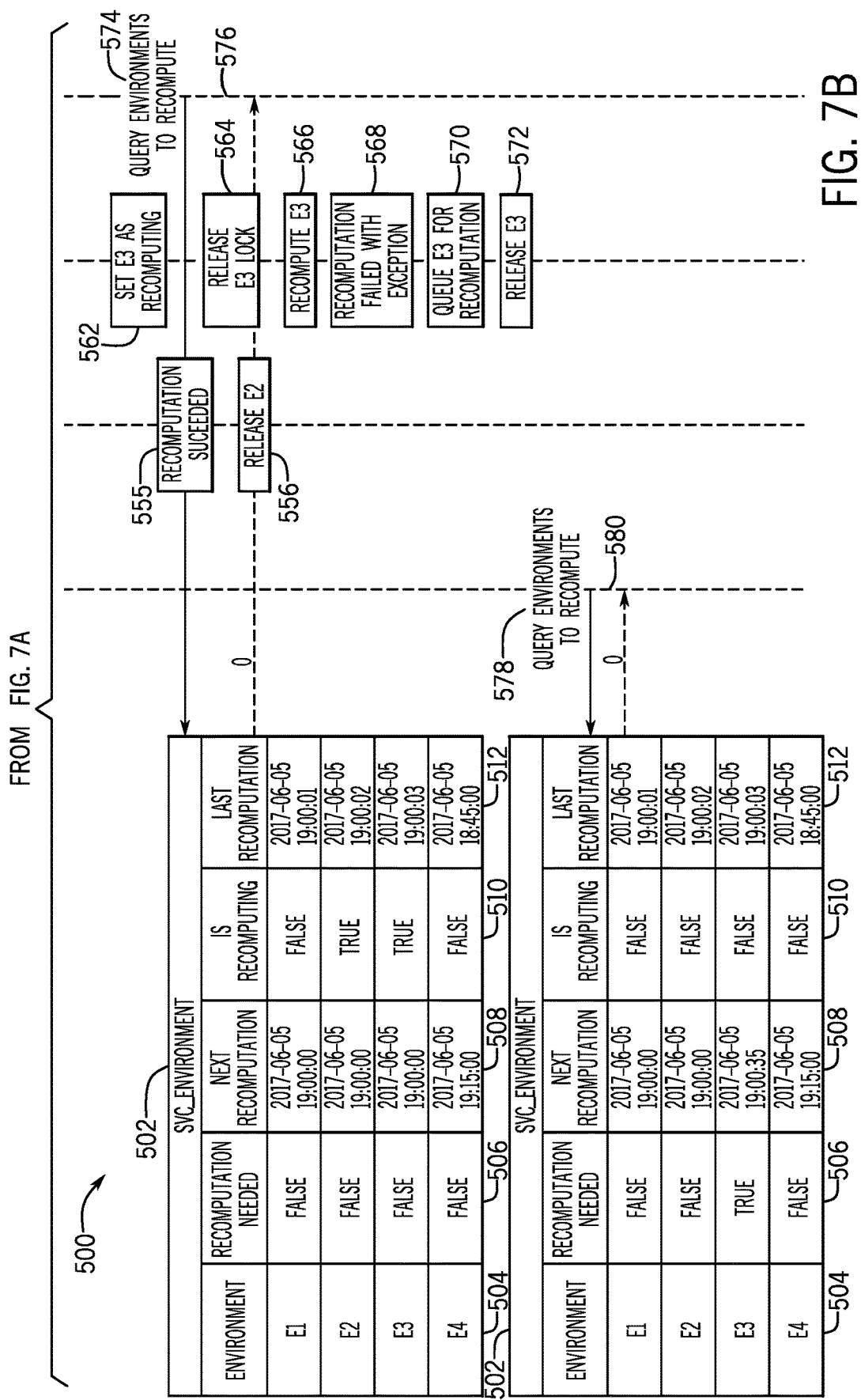

FIGS. 7A and 7B illustrate a sequence diagram 500 that utilizes a service environment database 502. As illustrated, the service environment database 502 includes an environment index 504, a recomputation needed field 506, a next recomputation field 508, a recomputing field 510, and a last recomputation field 512. The environment index 504 indexes environments as part of the platform 104. The recomputation needed field 506 is a flag that indicates whether the environment is to be recomputed as previously discussed in reference to FIG. 5. The next recomputation field 508 indicates a period of time after which the environment may be recomputed. The next recomputation field 508 may include an absolute time (as indicated) or a relative time that prevents a recomputation of a single environment from consuming too many resources for too long. The recomputing field 510 indicates whether the environment is being currently being recomputed. The last recomputation field 512 may indicate when the last recomputation has been performed.

The sequence diagram 500 also shows recomputation jobs 514, 516, 518, and 520 that may be run on separate worker threads or may be run on a same worker thread when not running at the same time.

The recomputation job 514 sends a query 522 to the service environment database 502 to determine whether any environments are to be recomputed. In the illustrated embodiment, the recomputation job 514 receives a response 524 from the service environment database 502 that E1, E2, and E3 are flagged as needs recomputation in the recomputation needed field 506. The recomputation job 514 selects an environment using some rules. For example, the environment that has gone the longest since a last recomputation, a prioritization rule, an order of index of the environment, and/or other factors. In the illustrated embodiment, the recomputation job 514 selects E1. The recomputation job 514 then locks E1 (block 526) and sets E1 as recomputing (block 528) using the recomputing field 510. Once the recomputing field 510 is set to recomputing, the recomputation job 514 then releases the lock on E1 (block 530).

During the actions running on recomputation job 514 to recompute E1, the recomputation job 516 also sends a query 532 the service environment database 502. In response to the query 532, the recomputation job 516 receives a response 534 that indicates that E1, E2, and E3 are to be recomputed. The recomputation job 516 selects an environment using rules. The recomputation job 516 attempts to select E1 and set a lock on E1. However, since E1 has been locked by recomputation job 514, the lock fails (block 536). The recomputation job 516 moves to the next environment based on the rules. The recomputation job 516 then successfully locks E2 (block 538). Once the lock is set, the recomputation job 516 sets E2 as being recomputed (block 540) using the recomputing field 510. Once the recomputation flag is set, the recomputation job 516 releases the lock on E2 (block 541).

During the actions running on the recomputation jobs 514 and 516, the recomputation job 518 also sends a query 542 to the service environment database 502 and receives a response 544 that indicates that E2 and E3 need to be recomputed.

Once a recomputation job marks an environment as being recomputed, the recomputation job begins recomputing the environment. For example, the recomputation job 514 recomputes E1 (block 546) using one or more of the previously discussed recomputation schemes. Once recomputation has succeeded (block 548), the recomputation job 514 releases E1 (block 550). Similarly, recomputation job 516 recomputes E2 (block 554). Once recomputation of E2 has succeeded (block 555), recomputation job 516 releases E2 (block 556).

Returning to the recomputation job 518, after recomputation job 518 has received the response 544, the recomputation job 518 tries to select E2. Since the lock on E2 had previously been released by the recomputation job 516, the recomputation job 518 successfully locks E2 (block 557). However, at this point, E2 is still marked as being recomputed. Accordingly, the recomputation job 518 skips E2 (block 558). Since E3 was the only other environment marked to be recomputed, the recomputation job 518 locks E3 (block 560). The recomputation job 518 then sets E3 to recomputing (block 562) and releases the lock E3 (block 564). Once E3 is marked as recomputing, the recomputation job 518 recomputes E3 (block 566).

Recomputation fails with an exception (block 568). Other reasons that may cause the recomputation to fail may include a failure to invalidate due to a recomputation request on a layer arriving while the recomputation is being processed. Due to the failure, the recomputation job 518 requeues E3 for recomputation (block 570). For example, the recomputation job 518 may increment the next recomputation field 508 to some time (e.g., 30 seconds) in the future and/or may start a timer that shows when a next recomputation may be performed. After the recomputation job 518 requeues E3, the recomputation job 518 releases E3 for other recomputations (block 572).

The recomputation job 520 sends a query 574 to the service environment database 502. As illustrated, at this time, the service environment database 502 has no environments marked for recomputation needed. Accordingly, a response 576 received at the recomputation job 520 from the service environment database 502 includes no pending environments to be recomputed. For example, the response 576 may include a value (e.g., null) that indicates that no environments currently need to be recomputed. In some embodiments, after no environments need recomputing, the worker thread running the recomputation job 520 may be cleared to perform other functions.

The recomputation job 514 sends a query to the service environment database 502 requesting environments to be recomputed. As illustrated, at this time only E3 is flagged as needing recomputation. However, the next recomputation field 508 corresponding to E3 indicates that the delay induced in block 570 has not elapsed. Accordingly, the service environment database 502 returns a response 580 that includes a value (e.g., null) that indicates that no environments currently need to be recomputed. In some embodiments, after no environments need recomputing, the worker thread running the recomputation job 514 may be cleared to perform other functions.

Figure 8:
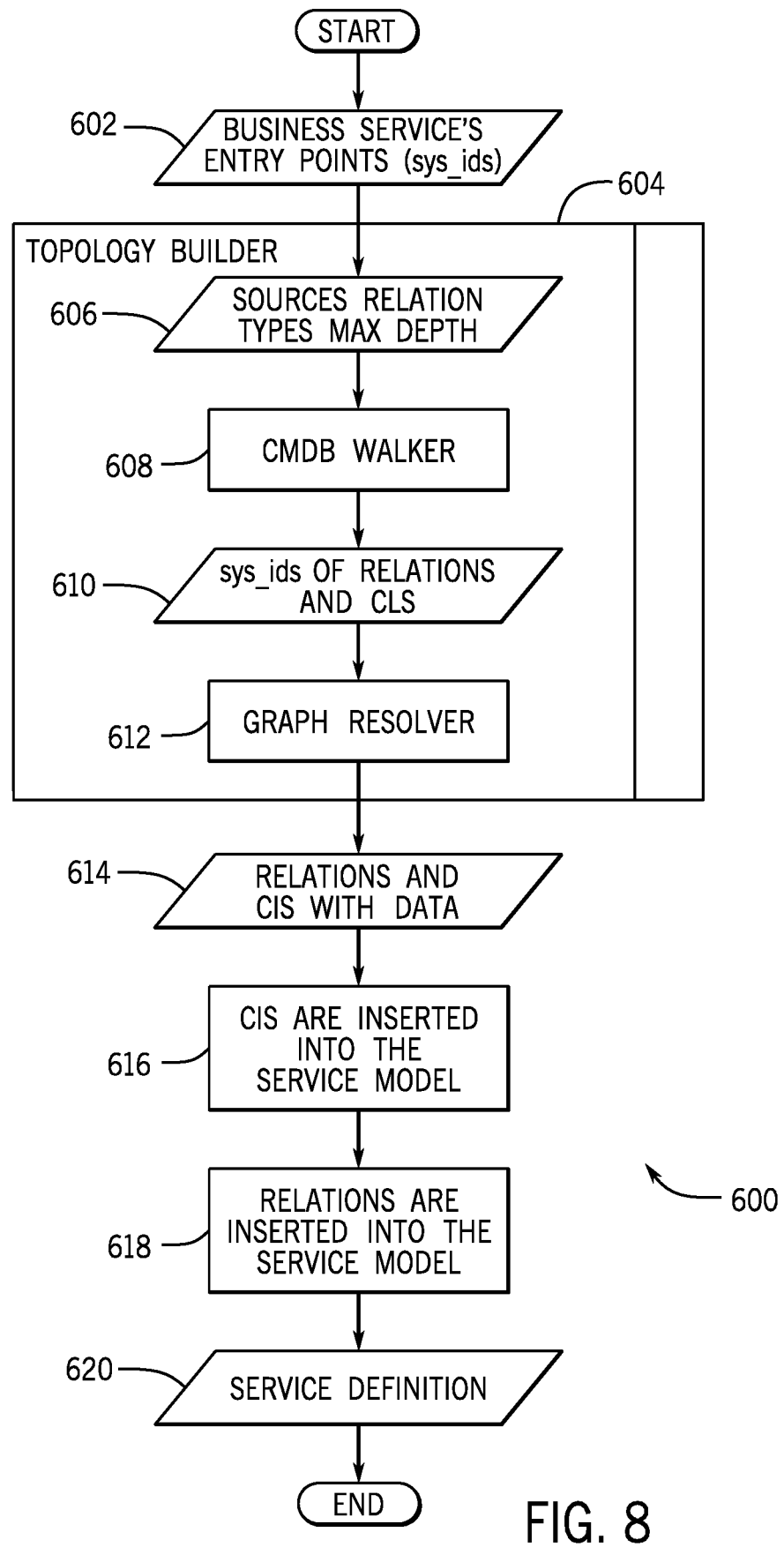
FIG. 8 is a flow diagram of a recomputation process that may be used to recompute the marked environments, in accordance with an embodiment.

FIG. 8 is a flow diagram of a recomputation process 600 that may be used to recompute the marked environments. Business service entry points (including system IDs) are passed (block 602) to a topology builder 604. The topology builder 604 is used to map a topology of the business service using the entry points. The topology builder 604 receives a list 606 of sources, relation types for the sources, and/or a max depth from the entry point and/or the CMDB 108. The topology builder 604 uses a CMDB walker 608 to walk-through the CMDB 108. The CMDB walker 608 walks through the CMDB 108 to obtain system IDs 610 of relations and CIs for the entry points. The topology builder 604 then utilizes a graph resolver 612 to resolve these items into a graph of the CIs 110 and their relationships including the entry point. The graphs may be data formatted in any suitable format, such as a spreadsheet, array, drawn graph, vectors, The graph 614 and its relations and CIs 110 are passed to the service model 312. The CIs 110 are added to the service model 312 (block 616). The relations are also added to the service model 312 (block 618). These changes are then used to update the service definition 620.

Figure 9:
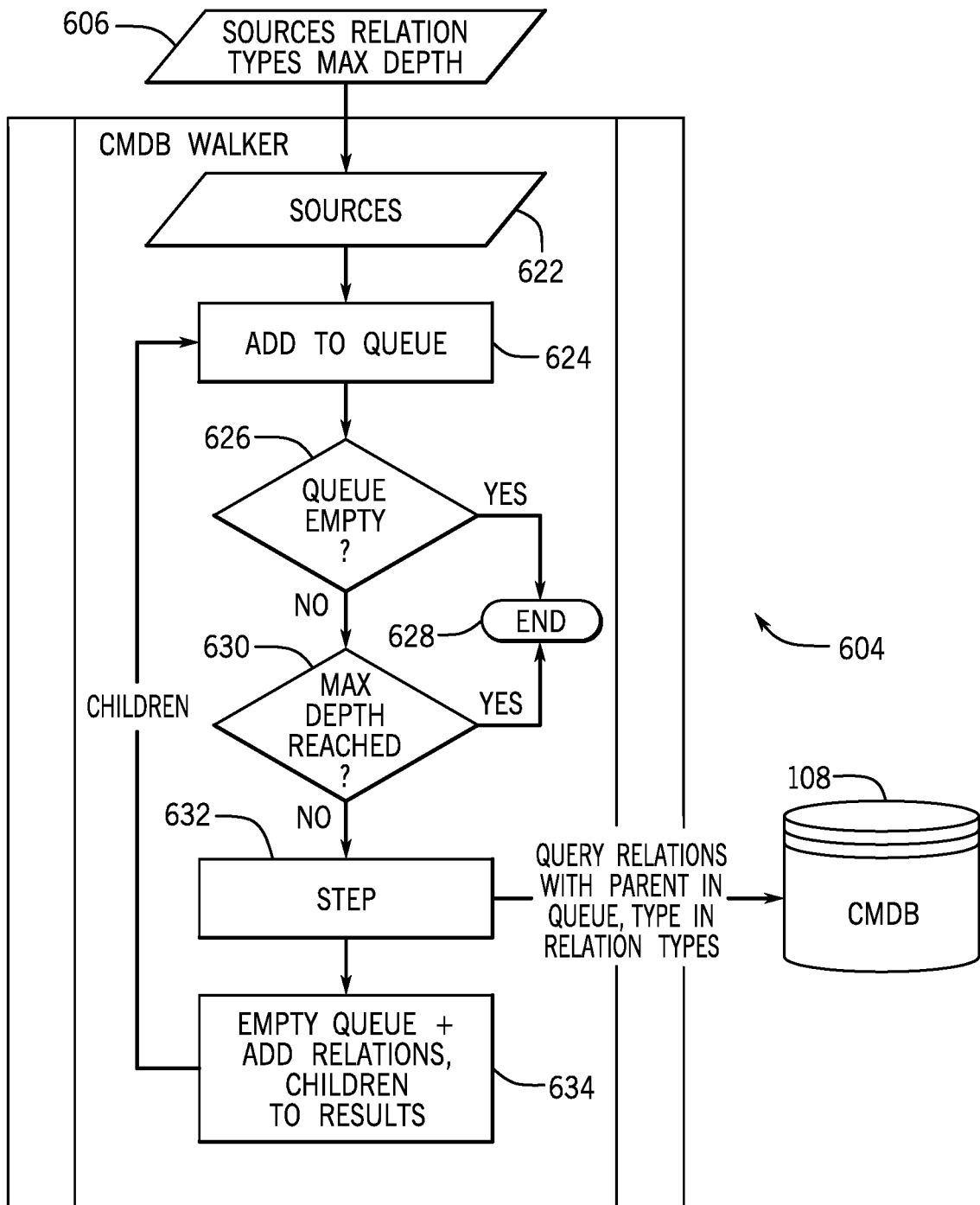
FIG. 9 is a flow diagram of a CMDB Walker used in the process of FIG. 8, in accordance with an embodiment.

FIG. 9 is a flow diagram of a CMDB walker 608 used in the process 600 of FIG. 8. The CMDB walker 608 receives sources 622 and adds them to a queue for processing (block 624). The CMDB walker 608 determines whether the queue is empty (block 626). If the queue is empty, the CMDB walker 608 ends the walking process (block 628). If the queue is not empty, the CMDB walker 608 determines whether the max depth indicated in the list 606 has been reached (block 630). If the max depth has been reached, the CMDB walker 608 ends the walking process. If the max depth has not been reached, the CMDB walker 608 queries relations with a parent for the CI and relation types (block 632). The CMDB walker 608 also empties the CI from the queue (i.e., empty the queue) and adds relations for any children of the CI to the results that are added back to the queue (block 634).

Figure 10:
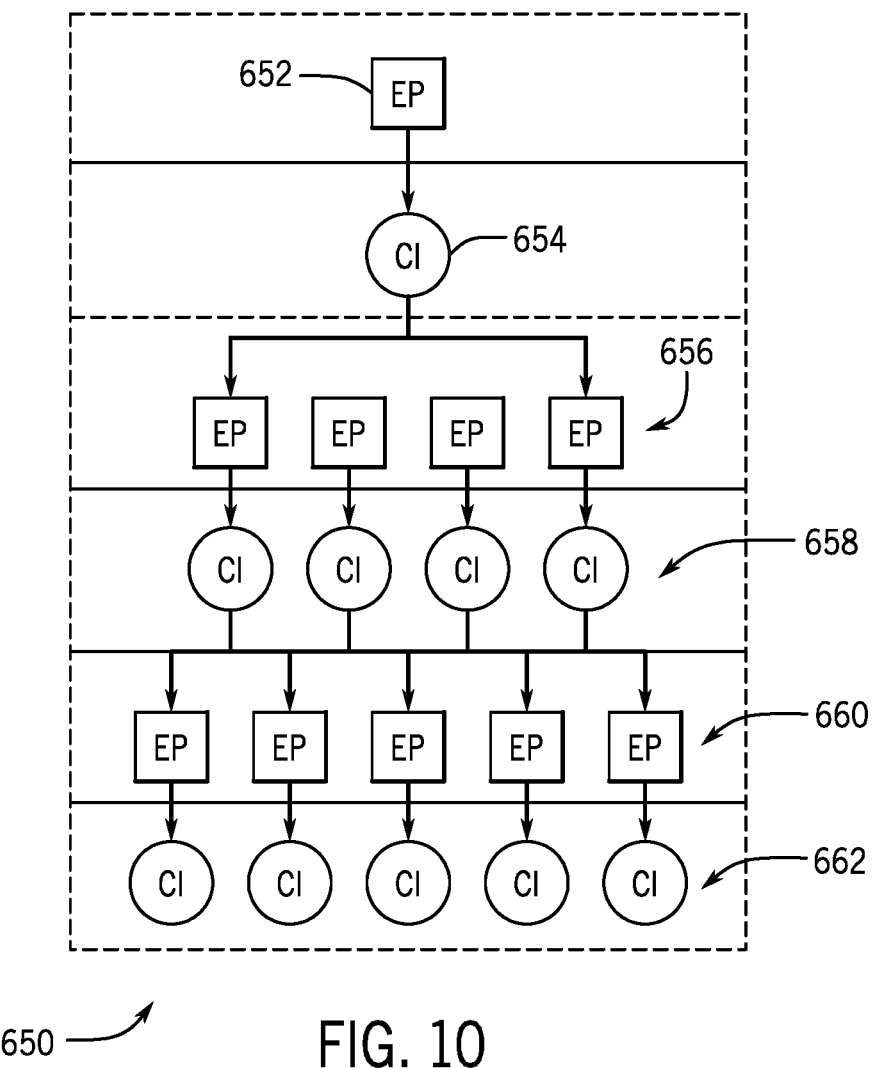
FIG. 10 illustrates a breadth-first traversal of an environment, in accordance with an embodiment.

FIG. 10 illustrates a breadth-first traversal 650 of an environment by the CMDB walker 608. The CMDB walker 608 implements the breadth-first traversal 650 based on query results from the CMDB 108. A first query using an entry point 652 that results in a CI 654. A second query using the CI 654 results in entry points 656. A third query using the entry points 656 results in CIs 658. A fourth query using the CIs 658 results in entry points 660. A fifth query using the entry points 660 results in CIs 662. In other words, the breadth-first traversal 650 results in all data being fetched in five queries. However, a depth-first traversal may result in at least thirty queries. In other words, as previously discussed, by dividing the service into breadth slices, a number of queries to the CMDB 108 may be reduced.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
  a service environment database comprising one or more service environments associated with one or more service models that are flagged for recomputation; and
  a computing system configured to provide a recomputation engine, wherein the computing system comprises one or more processors and a memory comprising instructions that, when executed by the one or more processors, cause the one or more processors to perform, using the recomputation engine, operations comprising:
    querying the service environment database for a first service environment of the one or more service environments that is flagged for recomputation;
    receiving an indication of the first service environment that is flagged for recomputation from the service environment database; and
    in response to receiving the indication of the first service environment that is flagged for recomputation, performing recomputation of the first service environment at least in part by:
      performing discovery of an environment corresponding to the first service environment to identify one or more changes to one or more configuration items in the environment; and
      in response to identifying the one or more changes to the one or more configuration items in the environment, updating each service model of the one or more service models to include respective indications of the one or more changes to the one or more configuration items as a result of recomputation of the first service environment.

2. The system of claim 1, comprising a configuration management database configured to store one or more configuration files associated with the one or more configuration items.

3. The system of claim 2, wherein the one or more configuration files comprise data indicating one or more properties, one or more attributes, one or more dependencies, or one or more relationships, or any combination thereof, for the one or more configuration items.

4. The system of claim 2, wherein the computing system is configured to provide a service mapping engine, and wherein the instructions cause the one or more processors to perform, using the service mapping engine, additional operations comprising:
  detecting the one or more changes to the one or more configuration items;
  receiving a service layer associated with the one or more changed configuration items from a service model database, wherein the service model database comprises one or more service model associations for the one or more configuration items; and
  flagging the service layer for recomputation in the service model database.

5. The system of claim 4, wherein the additional operations comprise flagging a particular service environment of the one or more service environments in the service environment database to indicate that the particular service environment is flagged for recomputation in response to flagging the service layer.

6. The system of claim 4, wherein the additional operations comprise detecting the change to the one or more configuration items at least in part by:
  determining that a configuration file of the one or more configuration files is associated with the one or more changed configuration items; and
  identifying a change in the configuration file, a removal of the configuration file, a relationship change between the configuration file and an additional configuration file of the one or more configuration files, a relationship change between the one or more configuration items and one or more additional configuration items, or an addition to the configuration file, or any combination thereof.

7. The system of claim 1, wherein the operations comprise:
  querying the service environment database for a second service environment of the one or more service environments that is flagged for recomputation; and
  scheduling recomputation of the first service environment and the second service environment.

8. The system of claim 7, wherein the operations comprise assigning respective priorities to the first service environment and the second service environment based at least in part on respective quantities of time since respective previous recomputations of the first service environment and the second service environment, one or more prioritization rules, an order of index of the first service environment and the second service environment, or any combination thereof.

9. The system of claim 1, wherein the operations comprise:
  determining that a number of worker threads performing one or more recomputation jobs is less than a threshold number of worker threads; and in response to determining that the number of worker threads performing the one or more recomputation jobs is less than the threshold number of worker threads, performing recomputation of the first service environment at least in part by assigning a worker thread of the number of worker threads to perform the discovery of the environment corresponding to the first service environment.

10. The system of claim 9, wherein the operations comprise, in response to determining that the number of worker threads performing the one or more recomputation jobs is greater than or equal to the threshold number of worker threads, scheduling the discovery to be performed at a later time.

11. A non-transitory, computer-readable, and tangible medium storing instructions configured to cause one or more processors to:
query a service environment database for a first service environment of one or more service environments that is flagged for recomputation, wherein one or more service environments are associated with one or more service models;
receive an indication of the first service environment that is flagged for recomputation from the service environment database; and
in response to receiving the indication of the first service environment that is flagged for recomputation, performing recomputation of the first service environment at least in part by:
assigning a worker thread to perform discovery of an environment corresponding to the first service environment; and
performing, using the assigned worker thread, discovery of the environment to identify one or more changes to one or more configuration items in the environment.

12. The non-transitory, computer-readable, and tangible medium of claim 11, wherein the instructions are configured to cause the one or more processors to perform recomputation of the first service environment at least in part by:
determining that a number of worker threads performing one or more recomputation jobs is less than a threshold number of worker threads allocated for the one or more recomputation jobs, wherein assignment of the worker thread is based at least in part on the number of worker threads performing the one or more recomputation jobs being less than the threshold number of worker threads allocated for the one or more recomputation jobs; and
in response to determining that the number of worker threads performing the one or more recomputation jobs is greater than or equal to the threshold number of worker threads allocated for the one or more recomputation jobs, adding performance of discovery of the environment to a queue of recomputation jobs to postpone performance of discovery of the environment for a duration of time.

13. The non-transitory, computer-readable, and tangible medium of claim 11, wherein the instructions are configured to cause the one or more processors to assign the worker thread based at least in part on a queue of events.

14. The non-transitory, computer-readable, and tangible medium of claim 11, wherein the instructions are configured to cause the one or more processors to assign the worker thread based at least in part on a fixed number of recomputation jobs running periodically, and query a queue of recomputation jobs for a next recomputation job.

15. A method, comprising:
detecting a change to a configuration item stored in a configuration management database;
in response to detecting the change to the configuration item, flagging a service environment associated with the configuration item in a service environment database to indicate that the service environment is to be updated to reflect the change to the configuration item;
querying the service environment database for the service environment that has been flagged, wherein the service environment is associated with one or more service models;
receive an indication of the service environment that has been flagged from the service environment database; and
performing recomputation of an environment corresponding to the service environment to update the one or more service models associated with the service environment based on the change in the configuration management database.

16. The method of claim 15, wherein querying the service environment database comprises using a worker thread to query the service environment database.

17. The method of claim 16, comprising:
setting a maximum number of worker threads to be used for completing recomputations; and
in response to determining a number of worker threads currently being used for recomputations is less than the maximum number of worker threads, determining to query the service environment database using the worker thread.

18. The method of claim 15, wherein performing recomputation of the service environment to update the one or more service models comprises recomputing each service layer of the service environment.

19. The method of claim 15, comprising:
in response to beginning to perform recomputation of the environment corresponding to the service environment, locking the environment at least in part by setting a flag in the service environment database corresponding to the service environment; and
in response to ending performing recomputation of the environment corresponding to the service environment, releasing a lock of the environment at least in part by clearing the flag in the service environment database corresponding to the service environment.

20. The method of claim 15, comprising:
receiving a list of pending recomputation jobs including the service environment; and
using a rule set to select the service environment from the list of pending recomputation jobs as a next environment to be recomputed, wherein the rule set comprises selecting the service environment based on a length of time since last recomputation of the service environment.

* * * * *